United States Patent [19]

Danilevich et al.

[11] 4,398,108
[45] Aug. 9, 1983

[54] STATOR OF A CRYOGENIC ELECTRIC MACHINE

[76] Inventors: Yanush B. Danilevich, ulitsa Tipanova, 29, kv. 681; Vladimir N. Ostreiko, prospekt Ispytatelei, 20, kv. 598; Jury L. Chernikov, ulitsa Vernosti, 44, korpus 3, kv. 79; Lidia I. Chubraeva, ulitsa Bestuzhevskaya, 34, kv. 55, all of Leningrad, U.S.S.R.

[21] Appl. No.: 121,648

[22] Filed: Feb. 14, 1980

[30] Foreign Application Priority Data

Feb. 15, 1979 [SU] U.S.S.R. .............................. 2737674

[51] Int. Cl.³ .............................................. H02K 9/00
[52] U.S. Cl. .................................... 310/54; 310/58; 310/258
[58] Field of Search ................... 310/10, 40, 52, 53, 310/57, 58, 254, 64, 65, 259, 258, 54, 59, 60 R; 174/15 C, 15 CA; 336/58

[56] References Cited

U.S. PATENT DOCUMENTS

| | | | |
|---|---|---|---|
| 2,561,737 | 7/1951 | Hill | 310/65 |
| 3,242,418 | 3/1966 | Mela | 310/52 |
| 3,368,087 | 2/1968 | Madsen | 310/52 |
| 3,479,541 | 11/1969 | Robinson | 310/57 |
| 3,743,867 | 7/1973 | Smith | 310/52 |
| 3,922,573 | 11/1975 | Pluschke | 310/53 |

OTHER PUBLICATIONS

"Visokoispolzovannie Turbo-1 Gidrogeneratoris Neposredstvennium Ohlazhdeniem" Nauka Pub's, 1971, pp. 3-6.
"Magitodinamika" Bashtovoy; pp. 12-17; 1973; Bashtovoy.

Primary Examiner—R. Skudy
Attorney, Agent, or Firm—Lilling & Greenspan

[57] ABSTRACT

The annular cavity in the stator of a cryogenic electric machine is defined by the housing and by the cylindrical element holding the winding. An electrically non-conducting ferromagnetic liquid is introduced into the annular cavity and is permitted to flow therein. The ferromagnetic liquid also serves as a cooling liquid for the cryogenic electric machine. A cooling system is connected to the annular cavity and together they form a closed loop for the circulation of the ferromagnetic liquid. Axial ribs are provided on the inner surface of the housing to prevent rotation of the ferromagnetic liquid as it flows inside the annular cavity.

6 Claims, 6 Drawing Figures

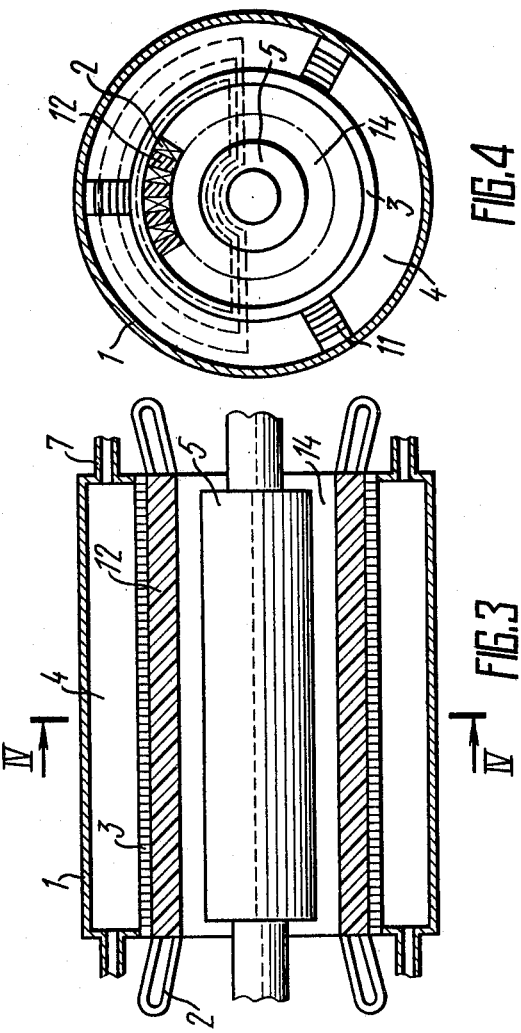

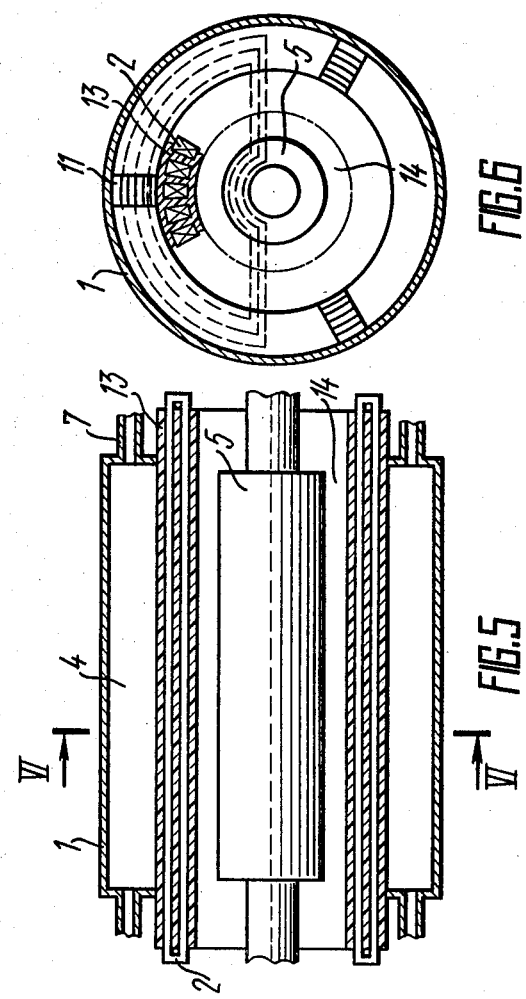

STATOR OF A CRYOGENIC ELECTRIC MACHINE

FIELD OF THE INVENTION

The present invention relates to electrical engineering and, more particularly, to stators of cryogenic electric machines with superconducting field winding.

The invention can be used most advantageously in high-power turbogenerators with a cryogenic rotor.

BACKGROUND OF THE INVENTION

Known in the art is a stator of a cryogenic electric machine with a superconducting field winding (cf. a paper by Dombrovsky V. V. et at "Voprosy proektirovanija kriogennih turbogeneratorov bolshoy moszhnosti" in a book "Visokoispolzovannie turbo- i gidrogeneratori s neposredstvennium ohlazhdeniem", Nauka Publishers, 1971, pp. 3–6), which stator comprises a housing accommodating a magnetic circuit and a winding. The magnetic circuit is a cylindrical laminated core made of electrical steel, the winding being fixed on the inner surface of the core, facing the rotor of a machine. The core may have both toothed and toothless construction. Direct liquid cooling of the core is provided through axial passages made therein to receive tubes filled with cooling liquid circulating within a closed system including an external cooler. Alongside with this direct liquid cooling of a stator winding is used.

However, the possibilities of liquid cooling of the core in the above stator have certain limitations. It is evident that the efficiency of cooling is increased with the increase in the number of axial passages provided in the stator core and used for circulation of a coolant, as well as with the increase in the area of cross-section of these passages. However, the number of said passages and the area of cross-section thereof are limited by the condition of providing sufficient mechanical strength of the core and the required area of cross-section of the magnetic circuit (active steel) which could not be decreased arbitrarily. This limits the possibilities of direct cooling of the core and stator as a whole. Besides it should be noted that direct cooling of the stator winding is known by a complicated way of feeding the coolant to current-carrying stator elements.

The problem of cooling becomes more acute for high-power turbogenerators, as well as for electric machines having a toothless core wherein its direct water cooling is complicated because of the need to use rather thin conductors of the winding thus decreasing the total efficiency of heat removal from a stator.

It should be also pointed out that the above stator has a comparatively large mass and overall dimensions due to the use of a steel laminated core as a magnetic circuit, while in cryogenic machines there is no need to use a large core, which is explained by specific peculiarities of these machines.

It is evident to those skilled in the art that in a rotor with superconducting field winding there are no limitations to the magnitude of magnetizing current. In this case, a magnetic excitation field of required intensity may be formed irrespective of the size of an air (nonmagnetic) gap in the machine and, which is of most importance, irrespective of the dimensions of a stator magnetic circuit and physical properties of the material which a magnetic circuit is made of. Moreover, said field may be formed in a stator even without a magnetic core which is accompanied, however, by extreme complication of the problem of retaining a stator winding and by penetration of the excitation field outside the machine so that a considerable part thereof becomes passive forming so called stray field.

Consequently, in cryogenic electric machines the role of a stator magnetic core is essentially different from its traditional role in conventional machines. In cryogenic machines a core takes upon itself dynamic forces from the winding and shields the space surrounding the machine from the excitation field, i.e. serves for retaining the winding and for localization of magnetic field within the limits of an active zone of the machine preventing it from leaking outside thereof. In conventional machines the main role of a stator core is only to enhance the magnetic excitation flux.

That is why in conventional machines a stator core is made sufficiently large so that induction therein would not exceed those values at which permiability of core steel starts to decrease. There is no need to enhance excitation flux in cryogenic machines while localization of the magnetic field in the active zone of a machine, shielding of the surrounding space and retaining of the winding may be achieved using a core of considerably smaller dimensions which provide an essential increase in induction thereof and a several times decrease in permeability of core steel. However, as mentioned above, the decrease in permeability of a stator core is of no importance in cryogenic machines, since it is possible to provide current rise in the superconducting field winding without extra expenditures of energy. Practically it is sufficient for cryogenic machines that the value of permeability of the stator magnetic circuit be equal to several tens of units, instead of hundreds thereof in a conventional machine at the highest saturation.

Thus, application of a magnetic circuit in the form of a comparatively massive steel core in the aforementioned stator is not functionally justified, resulting in the increase in stator mass and overall dimensions thereof. Application of an all steel magnetic circuit in a stator of a cryogenic machine is not reasonable because the high value of the magnetic flux results in strong saturation of the steel, making its use as a magnetic material inefficient and uneconomic.

SUMMARY OF THE INVENTION

It is an object of the present invention to increase the efficiency of cooling of a stator of a cryogenic electric machine with a superconducting field winding.

Another object of the present invention is to reduce the mass of the stator of a cryogenic electric machine.

Still another object of the present invention is to simplify the structure of the stator of a cryogenic electric machine.

With these and other objects in view, there is provided a stator of a cryogenic electric machine with a superconducting field winding, comprising a housing accommodating the winding and a magnetic circuit embracing thereof. According to the invention, at least a part of the magnetic circuit is formed by an electrically nonconducting ferromagnetic liquid filling an annular cylindrical cavity defined on the external side by the housing and being in communication with a cooling system forming in combination with said cavity a closed loop for circulation of the ferromagnetic liquid. Axial ribs are provided on the inner surface of the housing to prevent rotation of liquid while it flows along the cavity.

If the stator magnetic circuit is formed by a steel laminated core with a winding fixed on the inner surface thereof, the annular cavity is defined on the inner side by the outer surface of the laminated core.

If the stator comprises an annular cylinder made of an electrically insulating material and accommodating the winding integrally fitted therein, the annular cylindrical cavity is defined on the inner side by the outer surface of said annular cylinder.

It is an advantage of the present invention that the electrically non-conducting ferromagnetic liquid, filling the cylindrical cavity and forming the magnetic circuit of the stator, is used at the same time as a coolant circulating along the closed system including an external cooler. Due to the fact that the volume and the mass of the ferromagnetic liquid is several tens times greater than that of the liquid filling the axial passages of the laminated core, said ferromagnetic liquid used as a coolant allows heat removal from the magnetic circuit and from the stator winding to be improved, thereby making it possible to avoid direct cooling of the stator winding and to reduce many times the pressure and the speed of circulating liquid, providing thereby a considerable simplification of the stator construction. Since ferromagnetic liquid is equivalent by its magnetic properties to strongly saturated steel and has permeability which is many times greater than that of the air, it is considered to be a sufficiently suitable magnetic circuit for a cryogenic machine. At the same time, the specific mass of the ferromagnetic liquid is considerably less than that of the steel laminated core so the mass of the magnetic circuit and that of the stator is reduced as a whole.

The main advantage of the liquid magnetic circuit is in the possibility of "mounting" thereof, i.e. filling the cylindrical cavity of the stator with the ferromagnetic liquid, directly on the spot where a machine is installed. Assembling of the machine and its transportation can be accomplished with the lightened, "empty" magnetic circuit of the stator.

BRIEF DESCRIPTION OF THE DRAWINGS

These and other features and advantages of the present invention will become more apparent from the following description used to illustrate preferred embodiments of the invention when taken with the accompanying drawing, in which:

FIG. 3 is a sectional view taken longitudinally through a stator of a cryogenic electric machine with a superconducting field winding according to a second embodiment of the present invention;

FIG. 4 is a sectional view taken along the line IV—IV of FIG. 3;

FIG. 5 is a sectional view taken longitudinally through a stator of a cryogenic electric machine with a superconducting field winding according to a third embodiment of the present invention; and FIG. 6 is a sectional view taken along the line VI—VI of FIG. 5.

DETAILED DESCRIPTION OF THE INVENTION

Figures 1, 2:
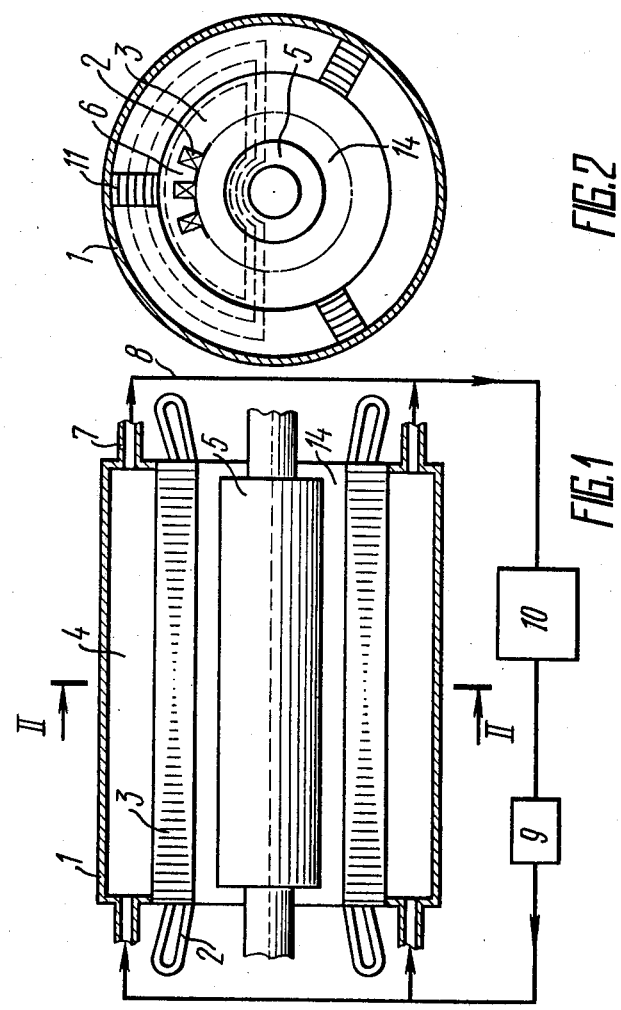
FIG. 1 is a sectional view taken longitudinally through a stator of a cryogenic electric machine with a superconducting field winding, according to one embodiment of the present invention.
FIG. 2 is a sectional view taken along the line II—II of FIG. 1.

Referring more particularly to the drawings, which are for the purpose of illustrating preferred embodiments of the invention only, and not for the purpose of limiting same, FIG. 1 best illustrates a stator of a cryogenic electric machine, which comprises, according to the invention, a housing 1 accommodating a winding 2 embraced by a magnetic circuit, which consists of a steel laminated core 3 and an electrically non-conducting ferromagnetic liquid filling an annular cylindrical cavity 4 defined on one side by the housing and on the other side by an outer surface of the laminated core 3. Stable suspensions of fine disperse phase of ferromagnetic material in water, toluene and other liquids may be used as said ferromagnetic liquid. Permeability of such ferromagnetic liquid is considerably higher than that of the air and approaches the permeability of strongly saturated steel (cf, reports of Bertrand R. Rev. Inst.-franc. petrole, 1970, 25, 1, 16 and of Bashtovoy V. G. et al. "Termomehanika magnitnih zhidkostey" zhurnal "Magnitodinamika", 1973, N 3, pp. 12–17). The fact that ferromagnetic liquid may have still lower permeability than strongly saturated steel, when superconducting winding is used, is of no essential importance because in this case, as is required, localization of magnetic flux in the active zone of a machine is provided and the value of magnetizing current is not limited. The rotor 5 of a cryogenic electric machine has a superconducting field winding (not shown).

The core 3 is made with slots, i.e. has teeth 6 (FIG. 2), provided on the inner surface thereof between which the winding 2 is placed. The height of the core back is chosen to be as minimal as the mechanical strength of the core allows so as to permit the greatest possible part of the magnetic circuit to be liquid.

Pipes 7, as best shown in FIG. 1, are used to communicate the annular cylindrical cavity 4 with a cooling system including pipelines 8, a pump 9 and an external cooler 10 arranged outside the machine. The cooling system and the cavity 4 form a closed loop for circulation of the ferromagnetic liquid. The number of the pipes 7 provided in the end surfaces of the cavity 4 and their cross-section are defined by calculations depending on the required volume and speed of the liquid flow.

According to the invention, axial ribs 11 (FIG. 2) laminated in a radial direction are mounted on the inner surface of the housing 1. The ribs 11 are used to prevent rotation of the ferromagnetic liquid when it flows within the cavity 4. In the embodiment illustrated in FIGS. 1 and 2 the axial ribs 11 serve also to support the core 3 in the housing 1, however the core 3 can be supported in the housing 1 with the help of the elements of the spring suspension arranged in the ferromagnetic liquid.

In the embodiment shown in FIGS. 3 and 4, the steel laminated core 3 is made toothless and the bars of the winding 2 are fixed on a frame 12, made, for example, of glass epoxy material, mounted on the inner surface of the core 3. The liquid part of the magnetic circuit of this embodiment is no different than the aforementioned.

FIGS. 5 and 6 illustrate another embodiment of the stator characterized in that the magnetic circuit is free from the laminated core, so the whole magnetic circuit is the annular cavity 4 filled with the ferromagnetic liquid. According to this embodiment, the stator comprises an annular cylinder 13 made of an electrically insulating material and used to retain the winding 2 forming in combination with the cylinder 13 an integral structure, the winding 2 being made without unbending endportions thereof. The annular cylindrical cavity 4 is defined on one side by the housing 1 and on the other side by the outer surface of the annular cylinder 13.

The three embodiments of the stator of a cryogenic electric machine, as best illustrated in FIGS. 1 to 6, are practically equivalent. A choice of a certain alternative depends on a series of conditions set or calculated for each particular design. These conditions include induction in the air-gap of the machine, linear current load of the stator winding, magnitudes of short-circuit currents in the stator winding, all these factors defining maximum electrodynamic forces in the winding, the way of its fastening, etc. Thus, for example, the embodiment shown in FIGS. 1 and 2 is preferable if reliability of retaining of the winding is concerned. The embodiment shown in FIGS. 3 and 4 is more vulnerable with reference to retaining the winding 2 on the core 3 and possibility of its accomplishment should be varified by calculation of the electrodynamic force in the winding for each particular structure. To achieve more complete realization of the objects set forth in the present invention the last mentioned embodiment of the stator structure is preferable when a laminated core is utterly excluded and, hence, the advantages of the invention are realized to the fullest extent.

When a cryogenic machine is in operation, the magnetic flux formed by the superconducting field winding arranged on the rotor 5 flows through the air-gap 74 (in the embodiment shown in FIGS. 1 and 2, also through the teeth 6 of the core 3) and is closed on the magnetic circuit of the stator, i.e. on the back of the core 3 and on the ferromagnetic liquid filling the annular cylindrical cavity 4. The paths of closing of the magnetic excitation flux within one polar pitch are shown in dashed lines in FIGS. 2, 4 and 6. A portion of the magnetic flux falling to the liquid part of the stator magnetic circuit is approximately defined by the expression:

$$\phi_1 = \phi_2 \frac{S_1 \mu_1}{S_2 \mu_2},$$

where
$\phi_1$ is the magnetic flux closed on the ferromagnetic liquid,
$S_1$ is the cross-sectional area of the cavity 4 (the liquid part of the magnetic circuit)
$\mu_1$ is the permeability of the ferromagnetic liquid,
$\phi_2$ is the magnetic flux closed on the core 3,
$S_2$ is the cross-sectional area of the back of the core 3, and
$\mu_2$ is the permeability of steel of the core 3.

Since permeability of the ferromagnetic liquid is near to that of strongly saturated steel, distribution of the magnetic flux between the liquid and steel parts of the magnetic circuit is found to be proportional to the cross-sectional areas thereof.

As mentioned above, the dimensions of the core are chosen to be such that the height of its back be the minimum allowed by the mechanical strength of the core. That is why a greater part of the magnetic excitation flux, even in the presence of the steel core 3, may be localized in the cavity 4 filled with the ferromagnetic liquid.

The ferromagnetic liquid is fed by the pump 9 through the cavity 4 and the cooler 10, performing the functions of a coolant for heat removal from the stator winding 2 and the core 3, thus providing essentially complete heat removal from said elements at a certain speed of ferromagnetic liquid flow owing to a large volume of the cavity 4.

The fact that the stator magnetic circuit is free from the steel core, as shown in FIGS. 5 and 6, brings no principal changes into operations of a cryogenic electric machine. In this case, the whole magnetic excitation flus is closed on the ferromagnetic liquid. Differences may be only of a quantitative character because in this embodiment larger volume of the ferromagnetic liquid is used.

Thus, the proposed stator structure of a cryogenic electric machine has the following advantages over previously khown stators:

increased efficiency of the stator cooling owing to a manifold increase in the volume of a coolant which is represented by a ferromagnetic liquid circulating within the closed loop including an external cooler;

reduction of the mass of the magnetic circuit by 5–6 times since the ferromagnetic liquid is characterized by a specific mass of from 1.3 to 1.7 g/cm$^3$ against 7.8 g/cm$^3$ for the steel laminated core, the mass of the whole machine being reduced in total approximately by 3 times because not less than half of the total mass of the machine falls on the stator magnetic circuit;

simplification of the construction, manufacture, transportation and assembling, which is defined by the following:

when effective cooling of the stator is provided, no need remains for direct water cooling of the stator winding that brings about particular complication in the stator structure induced by water supply to the currect-carrying parts of the stator;

simplification of the manufacture, transportation and assembling is achieved because of the possibility of performing these operations with no ferromagnetic liquid available in the stator cavity; and simplification of the manufacture is achieved also on account of the removal of the steel laminated core whose manufacturing technology is complicated or on account of the decrease in the size thereof.

The aforementioned embodiments of the invention do not limit the scope of the latter and are given merely as an illustration. It is also apparent that insignificant changes in the construction of the device can be made without departing from the spirit of the invention.

All these insignificant changes are considered to be within the spirit and scope of the invention as defined in the claims below.

What is claimed is:

1. An improved stator of a cryogenic electric machine, comprising a housing having outer and inner surfaces, an annular cylindrical cavity being defined by said inner surface of said housing; a winding arranged in said housing; a magnetic circuit arranged in said housing and embracing said winding, said magnetic circuit being defined by an electrically non-conducting ferromagnetic liquid flowing in said annular cylindrical cavity; a cooling system in communication with said annular cylindrical cavity and defining with said annular cylindrical cavity a closed loop for circulation of said ferromagnetic liquid, said electrically non-conducting ferromagnetic liquid being a part of said magnetic circuit and being used as a coolant in said cooling system; and a plurality of axial ribs provided on said inner surface of said housing to prevent rotation of said ferromagnetic liquid when said ferromagnetic liquid flows along said annular cylindrical cavity.

2. A stator as set forth in claim 1, wherein said magnetic circuit comprises a steel laminated core having an inner surface to retain said winding and an outer surface, said annular cylindrical cavity being defined by said inner surface of said housing and by said outer surface of said core.

3. A stator as set forth in claim 1 further comprising an annular cylinder made of an electrically insulating material and having said winding integrally fitted therein, said annular cylinder having an outer surface and an inner surface, and said annular cylindrical cavity being defined by said inner surface of said housing and by said outer surface of said annular cylinder.

4. A stator as set forth in claim 1, wherein said electrically non-conducting ferromagnetic liquid includes stable suspensions of fine disperse phase of ferromagnetic material in water.

5. A stator as set forth in claim 2, wherein said steel laminated core includes slots provided on the inner surface of said steel laminated core, said winding being arranged within said slots.

6. A stator as set forth in claim 2, wherein said steel laminated core further comprises a frame mounted on an inner surface of said steel laminated core, and said winding is fixed on said frame.

* * * * *